United States Patent
Liu et al.

(10) Patent No.: US 7,668,866 B2
(45) Date of Patent: *Feb. 23, 2010

(54) METHOD AND APPARATUS FOR DISTRIBUTING AV CONTENT IN A DOWNLOADABLE FILE FORMAT

(75) Inventors: Jing Liu, Singapore (SG); Ming Ji, Singapore (SG); Zhongyang Huang, Singapore (SG); Sheng Mei Shen, Singapore (SG); Takanori Senoh, Osaka (JP)

(73) Assignee: Panasonic Corporation, Osaka (JP)

( * ) Notice: Subject to any disclaimer, the term of this patent is extended or adjusted under 35 U.S.C. 154(b) by 99 days.

This patent is subject to a terminal disclaimer.

(21) Appl. No.: 10/569,639

(22) PCT Filed: Nov. 26, 2004

(86) PCT No.: PCT/JP2004/017561

§ 371 (c)(1),
(2), (4) Date: Jul. 12, 2006

(87) PCT Pub. No.: WO2005/060259

PCT Pub. Date: Jun. 30, 2005

(65) Prior Publication Data

US 2007/0028235 A1    Feb. 1, 2007

(30) Foreign Application Priority Data

Dec. 2, 2003    (JP) .............................. 2003-403224

(51) Int. Cl.
*G06F 17/30* (2006.01)

(52) U.S. Cl. .................................. 707/104.1; 713/189

(58) Field of Classification Search ....................... None
See application file for complete search history.

(56) References Cited

U.S. PATENT DOCUMENTS 6,353,892 B2    3/2002    Schreiber et al.
6,895,555 B1*   5/2005    Ando .......................... 715/719
7,299,362 B2*   11/2007   Shen et al. .................. 713/189

(Continued)

FOREIGN PATENT DOCUMENTS

JP    1079627    *    2/2001

(Continued)

OTHER PUBLICATIONS

ISO/IEC14496-1: 2001 FDAM3: 2003 (ISO/IEC JTC1/SC29/WG11 N5282, Dec. 4, 2002).

(Continued)

*Primary Examiner*—Neveen Abel Jalil
*Assistant Examiner*—Son T Hoang
(74) *Attorney, Agent, or Firm*—Greenblum & Bernstein, P.L.C.

(57) ABSTRACT

A method of embedding copyright management information in AV (audio visual) content that is distributed in a downloadable file format. In a MP4 file format, which is a format for distributing downloadable files, content data is separated by code into a general stream and an IPMP (intellectual property management and protection) controlled media stream. A box for embedding data required for IPMP initialization and a box for embedding data required to interpret IPMP and related parameters are rendered in a first box that is rendered in a control data box.

10 Claims, 3 Drawing Sheets

U.S. PATENT DOCUMENTS

| | | | |
|---|---|---|---|
| 2002/0018580 A1* | 2/2002 | Maeda | 382/100 |
| 2002/0035544 A1* | 3/2002 | Wakao et al. | 705/51 |
| 2002/0078178 A1 | 6/2002 | Senoh et al. | |
| 2002/0116633 A1* | 8/2002 | Kobayashi et al. | 713/200 |
| 2002/0156744 A1 | 10/2002 | Senoh et al. | |
| 2003/0188182 A1* | 10/2003 | Sato et al. | 713/193 |
| 2004/0034600 A1 | 2/2004 | Senoh et al. | |
| 2004/0093337 A1 | 5/2004 | Shen et al. | |
| 2004/0236955 A1 | 11/2004 | Shen et al. | |
| 2004/0236956 A1 | 11/2004 | Shen et al. | |
| 2005/0015707 A1 | 1/2005 | Ji et al. | |
| 2005/0075998 A1 | 4/2005 | Huang et al. | |
| 2005/0204067 A1 | 9/2005 | Ji et al. | |
| 2006/0072395 A1 | 4/2006 | Kobayashi | |

FOREIGN PATENT DOCUMENTS

| | | |
|---|---|---|
| JP | 2003-199063 | 7/2003 |
| WO | 03/015416 | 2/2003 |
| WO | 03/055219 | 7/2003 |
| WO | 03/067819 | 8/2003 |
| WO | 2003/067893 | 8/2003 |

OTHER PUBLICATIONS

English Language Abstract of JP 2003-199063.

Gene et al., "A Configuration Message Format for Selective Encryption Tools", Video Standards and Drafts, No. M7216, Jun. 8, 2001, XP030036333.

Gene et al., "A Format-Compliant Configurable Encryption Framework for Access Control of Multimedia", Video Standards and Drafts, No. M7213, Jun. 2, 2001, XP030036330.

Gene et al., "Rational for Format-Compliant Configurable Selective Encryption in IPMP standardization", Video Standards and Drafts, No. M7212, Jun. 2, 2001, XP030036329.

Jiangtao (Gene) et al., "A Format-Compliant Configurable Encryption Framework for Access Control of Video", IEEE Transactions on Circuits and Systems for Video Technology, IEEE Service Center, Piscataway, NJ, US, vol. 12, No. 6, Jun. 1, 2002, XP011071844.

ISO/IEC14496-1: 2001 FDAM3: 2003 (ISO/IEC JTC1/SC29/WG11 N5282, Dec. 4, 2002).

ISO/IEC14496-12 & 15444-12: ISO Base Media File Format, Amendment 1 (ISO/IEC JTC1/SC29/WG11 N6090, Dec. 15, 2003).

English Language Abstract of JP 2003-199063.

Visharam et al., "Storage/signaling of encrypted media in MP4", Joint Video Team (JVT) of ISO/IEC MPEG & ITU-T ISO/IEC JTC1/SC29/WG11, No. M10176, Oct. 15, 2003, pp. 1-4, XP030039054, Brisbane, Australia.

* cited by examiner

METHOD AND APPARATUS FOR DISTRIBUTING AV CONTENT IN A DOWNLOADABLE FILE FORMAT

BACKGROUND OF THE INVENTION

The present invention relates to a method of embedding copyright management information in AV content that is distributed in a downloadable file format. More particularly, the present invention relates to MPEG-4 Intellectual Property Management and Protection (IPMP) for MPEG-4 media streams distributed in the MP4 file format.

There are two basic methods of distributing AV content, in streams or as downloadable files. In the stream distribution method the content supplier transmits AV content data in a stream that is reproduced as it is received on the receiver (player) side. The distributed content can therefore be reproduced with only a short wait after transmission begins. In the downloadable file model, however, the content supplier transmits the AV content data as a file. The receiver (player) can therefore start playback only after all AV content data has been received, and playback cannot start until all of the AV content data has been transferred to the receiver.

The present invention relates to a downloadable file format, and is described herein using the MP4 file format by way of example as a downloadable file format.

The MP4 file format is defined as a part of the MPEG-4 System specification. More specifically, however, the MP4 file format is a specific use of the more general ISO Base Media File Format. The MP4 file format is a generic file format enabling easy local manipulation of media data, and maintains streaming protocol independence. Media data in the MP4 file format is stored in its most natural format and is thus not fragmented.

Figure 1:
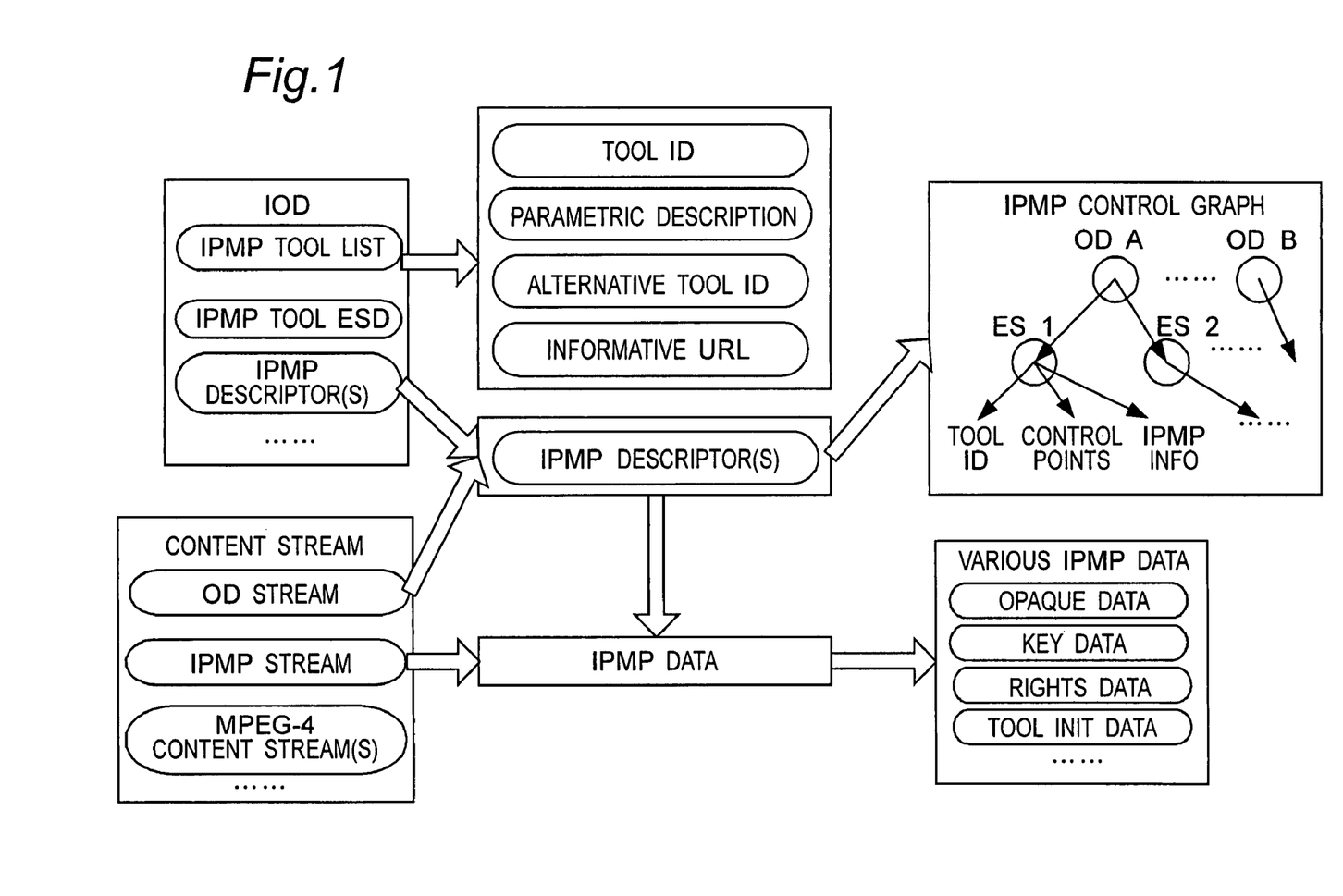
FIG. 1 shows the data structure of MPEG-4 IPMP Extension content.

The MPEG-4 System specification also defines the IPMP Extension specification as the mechanism for protecting media streams in the MPEG-4 System context. It defines, for example, how to protect a protected MP4 file format that is protected by encryption. In the IPMP mechanism an IPMP descriptor is stored in the MP4 file in addition to the protected media stream to enable determining which stream is protected and how. More precisely, the IPMP descriptor is stored in an object descriptor which contains other MPEG-4 System information as well. FIG. 1 shows the general architecture of the MPEG-4 IPMP protection scheme.

An MPEG-4 System compatible terminal can read object descriptors from an MP4 file, and can parse the descriptor further to read any IPMP descriptors stored in the object descriptors. The IPMP descriptor provides content information relating to how the associated media streams are protected and which IPMP tool should be used for further processing. This prior art is disclosed in non-patent reference 1.

Because the MP4 file format enables easy local manipulation of media data, many specifications other than MPEG-4, such as ISMA and 3GPP, also use the MP4 file format as their own default file format. Furthermore, for practical purposes, these specifications have the same requirement as the MPEG-4 System to protect the media stream by, for example, encryption. However, due to the lack of full MPEG-4 System support, it is not possible for these specifications to use already defined IPMP solutions to directly protect their own media stream. Given an MP4 file which contains IPMP protected streams, receivers compatible only with these specifications cannot recognize either the Object Descriptor or IPMP Descriptor. Furthermore, because the conversion information is only stored in the IPMP descriptors, these receivers have no means of determining if a received media stream is unrestricted or is protected. An alternative mechanism is therefore needed to enable these terminals to handle MP4 files in a protected media stream.

Non-patent reference 1: ISO/IEC14496-1/FDAM3 (ISO/IEC JTC1/SC29/WG11 N5282)

SUMMARY OF THE INVENTION

This invention tries to solve the following problems.

IPMP protection of distributed AV content has been possible for stream distribution of AV content, but IPMP protection of distributed AV content has not been possible for downloaded content. An object of the present invention is therefore to render a method and apparatus enabling IPMP protection of distributed AV content even when the content is distributed as a downloadable file.

The MPEG-4 system defines an IPMP mechanism for protecting media streams stored in the MP4 file format. IPMP information is stored in IPMP descriptors which are carried in the OD stream. Each time an MPEG-4 System compatible receiver reads an IPMP descriptor, it knows that the media stream associated with this descriptor is managed by IPMP.

However, many specifications such as ISMA and 3GPP use only some MPEG-4 stream type descriptors and the MP4 file format, and do not require an MPEG-4 System. Receivers compatible with these specifications store the MPEG-4 media stream but can read only simple MP4 files that do not contain other MPEG-4 System information. When an MP4 file with IPMP-controlled media streams is supplied, the object descriptors and IPMP descriptors in the MP4 files are contained in the MPEG-4 system information and therefore cannot be read by such receivers. If the receiver does not know that these are protected streams and attempts to process them as ordinary streams, these receivers crash because the code points of the protected streams may have changed.

The present invention aims to solve the foregoing problem. The present invention enables a simple MP4 file receiver, that is, a non-MPEG-4-compatible receiver, to identify whether media streams in a received MP4 file are unrestricted or IPMP controlled. The invention also renders a method enabling a file format means to provide IPMP information without requiring MPEG System information when the media stream is IPMP controlled.

To solve the problem of identifying unrestricted streams and IPMP-controlled streams in an MP4 file, this invention proposes using an alternative 4CC format identifier for media streams when the stream is IPMP protected.

A new set of data structures extending the MP4 "Box" structure is defined to provide the terminal with information about IPMP protection without requiring the receiver to support the MPEG-4 System.

In an MP4 file, an alternative format identifier instead of the original MPEG-4 identifier is used in the SampleEntry box to signal the presence of an IPMP governed stream.

If the media streams contained within this MP4 file are protected by IPMP, an ipmc box, which is an IPMPControlBox containing the IPMPToolList and the IPMP Descriptor and usage rights, should be stored in the moov layer.

If any media stream is governed by IPMP, an imif box, which is an IPMPlnfoBox, is constructed to store IPMP information. This IPMPlnfoBox is appended to the media stream's sample description, leaving all other boxes unmodified.

If a media stream within a given MP4 file is identified by the alternative format identifier on the receiver side, the receiver should know that the media stream is protected and look for the IPMPlnfoBox for further IPMP information.

Effects of the Invention

The present invention increases the number of formats that can be used to distribute IPMP-protected content data.

DETAILED DESCRIPTION OF THE PREFERRED EMBODIMENTS

Figure 2:
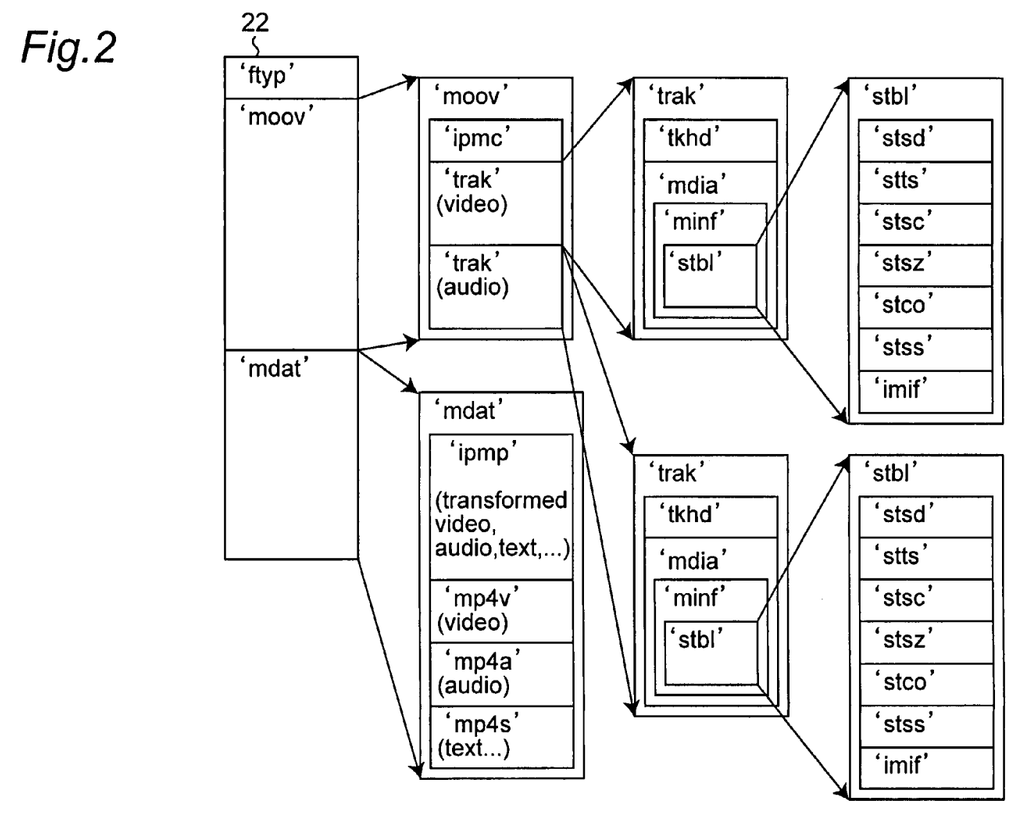
FIG. 2 shows the structure of an AV content media stream that is IPMP protected and distributed in a downloadable file format.

FIG. 2 shows a data structure according to the present invention for embedding copyright management information in AV content distributed in a downloadable file format. FIG. 2 is described below using MP4 by way of example.

The MP4 file format contains a plurality of boxes in a hierarchical structure. A box name is assigned to each box using a four character code. These box names are thus called "4CC format identifiers." The MP4 File Format is an extension of the ISO Base Media File Format, and the type of a media stream is identified by a 4CC format identifier in SampleEntry box instances. A box is a data container, and a box can be stored inside a box.

The MP4 file structure is described below. An MP4 file 22 contains an "ftyp" box denoting the file type, an "moov" box in which control data is collected and stored, and an "mdat" box in which content data is collected and stored.

The moov box contains an "ipmc" box storing data required for IPMP initialization, a "trak" box containing video control information, and a "trak" box containing audio control information. The "ipmc" box contains the IPMPToolList, IPMP Descriptor, and usage rights information.

The trak box containing video control information has a "tkhd" box containing header information, and a "mdia" box containing media-related data. The "mdia" box has a "minf" box containing media control information, and in the minf box has a "stbl" box gathering the different control information in a table.

The stbl box contains a "stsd" box containing codec property information, a "stts" box containing the time duration (presentation time) of each sample, a "stsc" box containing the sample and chunk relations, a "stsz" box containing the size of each sample, a "stco" box containing the starting position of each chunk, a "stss" box containing the sample numbers of randomly accessible samples, and an "imif" box containing the IPMP information.

The trak box containing audio control information has the same structure as the trak box containing video control information. That it, the trak box containing audio control information has a "tkhd" box containing header information, and a "mdia" box containing media-related data. The "mdia" box has a "minf" box containing media control information, and in the minf box has a "stbl" box gathering the different control information in a table.

The "stbl" box contains a "stsd" box containing codec property information, a "stts" box containing the time duration (presentation time) of each sample, a "stsc" box containing the sample and chunk relations, a "stsz" box containing the size of each sample, a "stco" box containing the starting position of each chunk, a "stss" box containing the sample numbers of randomly accessible samples, and an "imif" box containing the IPMP information.

The "mdat" box contains various boxes storing content data. Video content data that is not IPMP protected is stored in the "mp4v" box, audio content data is stored in the "mp4a" box, and text content data is stored in the "mp4s" box. IPMP-protected content data is stored in the "ipmp" box.

When AV content in the MP4 format shown in FIG. 2 is distributed, the AV content contained in file 22 can be reproduced by the receiver after all of file 22 has been downloaded. Reproduction starts by identifying the type of data contained in the mdat box, that is, whether the content data to be reproduced is IPMP-protected content data or content data that is not IPMP protected. If the content data is contained in the ipmp box, the data is processed as IPMP-protected content data. In this case the required decryption tool is determined from the IPMPToolList contained in the ipmc box and the content data is decrypted. The control points used by the IPMP tool and the control content are identified from the IPMP descriptor. The number of times the content can be played is controlled, and usage fees are imposed, according to the usage rights.

When the IPMP-protected content data is decrypted and reproduced, the watermark information is decrypted and copying is controlled based on the IPMP information in the imif box. An IPMP descriptor can also be stored in the imif box. The information required to interpret IPMP protection and the defined parameters is contained.

AV content that is transmitted and downloaded in an MP4 format can thus be IPMP protected as described.

As described above, the present invention separates AV content distributed in a downloadable file format into boxes for control data and boxes for content data, embeds data required for IPMP initialization, such as at least one of IPMP-ToolList, usage rights information, and IPMP Descriptor, in a first location in the control data box, such as the first box rendered at the beginning, and embeds data required to interpret the IPMP protection and parameters, such as at least one of IPMP Rights Data, IPMP Key Data, IPMP Tool Configuration Data, and IPMP Descriptor, in a second location inside the control data box, such as a second box. Data required to interpret IPMP protection and the related parameters can be stored in separate locations for video and audio, such as a 2A box and a 2B box. This enables separately managing video and audio. IPMP-related box names are assigned to the foregoing first box, 2A box, and 2B box.

Boxes for storing content data that is IPMP protected and boxes for storing content data that is not IPMP protected are rendered in the content data boxes, and an IPMP related box name is assigned to the boxes in which the IPMP-protected content data is written.

The receiver looks inside the imif box and ipmc box which is an IPMPInfoBox related to each media stream, and gets the IPMP protection information to be used in subsequent processing.

The moov level overall defines an additional IPMPControlBox which can store the IPMPToolList and signal to the terminal how many IPMP tools are needed to play all streams in the MP4 file. The usage rights can also be stored in this IPMPControlBox.

IPMPInfoBox, that is, the imif box, contains the information required to interpret the applied IPMP protection and its parameters. The IPMPInfoBox is a container Box, which should be carried within the Sample Table Box associated with the IPMP protected media samples in a track.

```
Box Type: 'imif'
Container: Sample Table Box ("stbl")
Mandatory: No
Quantity: Any number
aligned (8) class IPMPInfoBox extends Box('imif'){
    OriginalFormatBox original_format;
    IPMP_Descriptor ipmp_desc[];
}
Original Format Box
The Original Format Box contains the 4CC format of the sample
description.
aligned (8) class OriginalFormatBox(codingname) extends
Box('ofmt'){
    unsigned int (32) data_format = codingname;
}
data_format is the format of decrypted encoded data.
```

IPMP_Descriptor is defined in 14496-1. This is a part of the MPEG-4 object descriptors (OD) that describe how an object can be accessed and decoded. Here, in MP4 file format, IPMP Descriptor can be carried directly in IPMPInfoBox without the need for an OD stream.

The presence of IPMP Descriptor in this IPMPlnfoBox indicates the associated media stream is protected by the IPMP Tool described in the IPMP Descriptor.

Each IPMP_Descriptor has an IPMP_ToolID, which identifies the required IPMP tool for protection. An independent registration authority (RA) is used so any party can register its own IPMP Tool and for identification without collisions.

The IPMP_Descriptor carries IPMP information for one or more IPMP Tool instances, and includes but is not limited to IPMP Rights Data, IPMP Key Data, and Tool Configuration Data.

More than one IPMP Descriptor can be carried in this IPMPlnfoBox if the media stream is protected by more than one IPMP Tool.

IPMPControlBox, that is, ipmc box, is contained in the moov box to signal that all media streams within the current presentation are IPMP protected. It may contain IPMPTool-List and IPMP Rights Container.

```
Box Type: 'ipmc'
Container: Movie Box ('moov')
Mandatory: No
Quantity: Zero or One
aligned(8) class IPMPControlBox extends Box('ipmc') {
    IPMP_ToolListDescriptor toollist;
    int(8) no_of_IPMPDescriptors;
    IPMP_Descriptor ipmp_desc[no_of_IPMPDescriptors];
    string usage_rights;
}
```

The IPMP_ToolListDescriptor is defined in 14496-1, which conveys the list of IPMP tools required to access the media streams in the MP4 file, and may include a list of alternate IPMP tools or parametric descriptions of tools required to access the content.

The presence of IPMP Descriptor in this IPMPlnfoBox indicates that all media streams within the MP4 file are protected by the IPMP Tool described in the IPMP Descriptor. More than one IPMP Descriptor can be carried here if there is more than one IPMP Tool providing global control.

Optional usage_rights can be carried in IPMPToolListBox, for example, in MEPG-21 REL.

Figure 3:
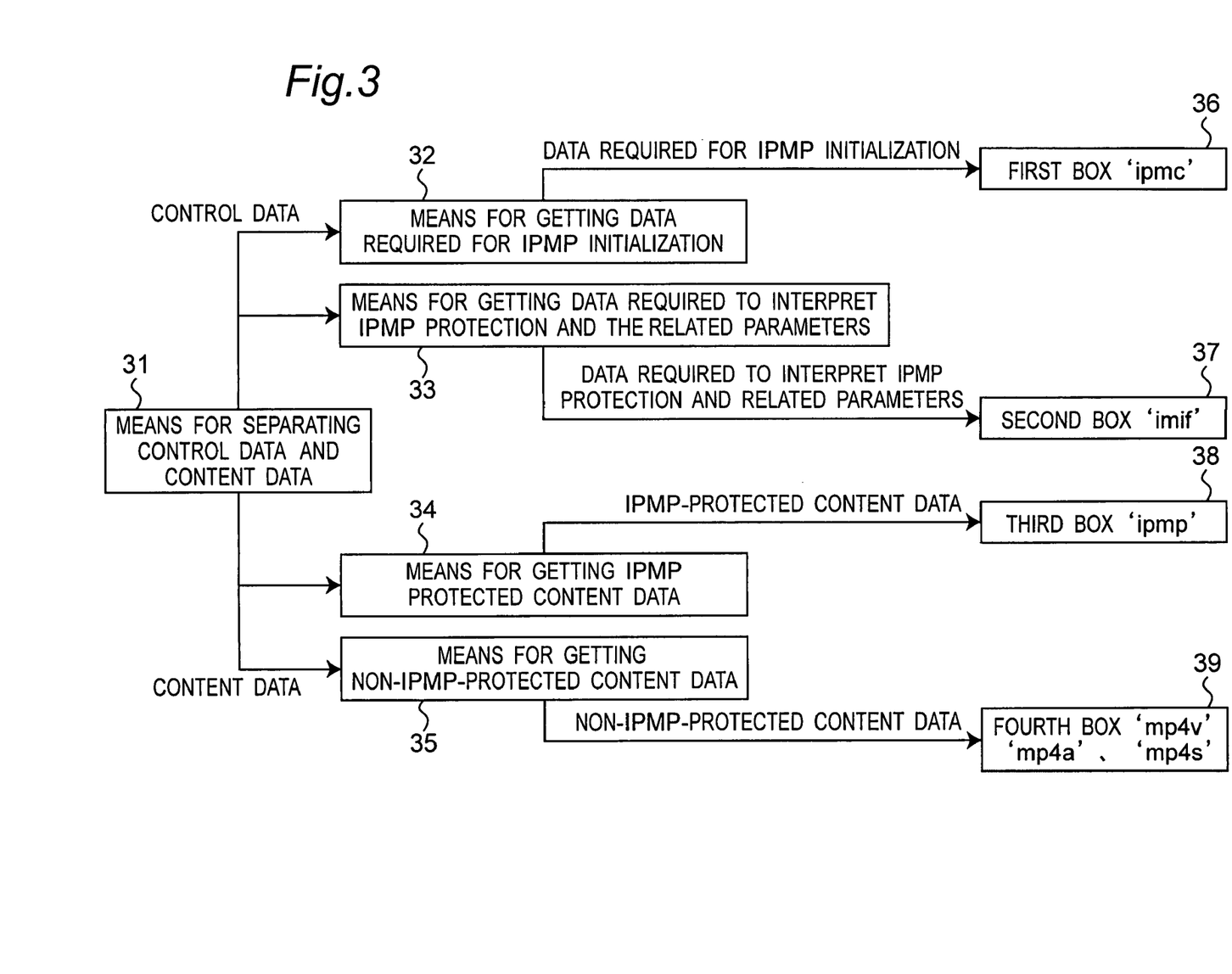
FIG. 3 is a block diagram of an apparatus for generating the media stream shown in FIG. 2.

FIG. 3 is a block diagram of an apparatus according to the present invention for distributing AV content in a downloadable file format. Such a distribution apparatus could be configured to include at least one computer processor and at least one readable storage means or storage medium.

As shown in FIG. 3 this apparatus has a means 31 for separating control data and content data, a means 32 for getting data required for IPMP initialization from the control data, a means 33 for getting data required to interpret IPMP protection and the related parameters from the control data, a means 34 for getting IPMP protected content data from the control data, a means 35 for getting non-IPMP-protected content data from the control data, a means 36 for storing data required for IPMP initialization in a first box, a means 37 for storing data required to interpret IPMP protection and the related parameters in a second box., a means 38 for storing IPMP protected content data in a third box, and a means 39 for storing non-IPMP-protected content data in a fourth box.

In the MP4 file format the first box is the ipmc box, the second box is the imif box, the third box is the ipmp box, and the fourth box is at least one of the mp4v box, mp4a box, and mp4s box.

Note that in FIG. 3 the means for separating control data and content data 31 is not needed if the control data and content data are generated as separate streams. Furthermore, one means for separating control data and content data 31 could be provided for IPMP-protected content data streams and another means for separating control data and content data 31 could be provided for non-IPMP-protected content data streams.

The invention proposes a new 4CC format identifier to distinguish unrestricted and IPMP-controlled MPEG-4 media streams. With the new identifiers, receivers without MPEG-4 System support can also be informed of the presence of IPMP-controlled streams.

This invention also creates a set of new Boxes in the MP4 file format to carry IPMP related information. Receivers without MPEG-4 system support can look for IPMP information here instead of in MPEG-4 System entries. With this new set of Boxes, receivers which are not conformant to the MPEG-4 System specification can fully utilize the interoperability and renewability capabilities afforded by the IPMP related information.

It should be noted that the present invention has been described using the MP4 file format by way of example, but the invention can also be applied to other formats, such as the ASF (Advanced File Format), enabling distribution as a downloadable file.

APPLICATION IN INDUSTRY

The present invention can be used as a method of embedding copyright management information in AV content that is distributed in a downloadable file format.

What is claimed is:

1. A method of distributing audio visual content in a file in a downloadable file format to a non-MPEG-4 compatible receiver so that the receiver can identify whether a media stream in a received file is unrestricted or is intellectual property management and protection controlled, wherein the file includes alternative format identifier control data that is used instead of MPEG-4 system information when the media stream is intellectual property management and protection controlled, comprising:

separating data in the file into a control data box and a content data box;

embedding data required for intellectual property management and protection initialization in a first box rendered in the control data box; and embedding data required to interpret intellectual property management and protection and related parameters in a second box rendered in the control data box, wherein the data required for intellectual property management and protection initialization embedded in the first box includes an intellectual property management and protection Tool List which conveys a list of tools required to access streams in the received file, an intellectual property management and protection Descriptor which describes a required intellectual property management protection, and Usage Rights which designate a number of times the content can be played.

2. A method of distributing audio visual content in a file in a downloadable file format to a non-MPEG-4 compatible receiver so that the receiver can identify whether a media stream in a received file is unrestricted or is intellectual property management and protection controlled, wherein the file includes alternative format identifier control data that is used instead of MPEG-4 system information when the media stream is intellectual property management and protection controlled, comprising:

getting data required for intellectual property management and protection initialization from the control data;

getting data required to interpret intellectual property management and protection and related parameters from the control data;

getting intellectual property management and protection-protected content data from content data;

getting non-intellectual property management and protection-protected content data from content data;

storing data required for intellectual property management and protection initialization in a first box;

storing data required to interpret intellectual property management and protection and related parameters in a second box;

storing intellectual property management and protection-protected content data in a third box; and storing non-intellectual property management and protection-protected content data in a fourth box, wherein the data required for intellectual property management and protection initialization stored in the first box includes an intellectual property management and protection Tool List which conveys a list of tools required to access streams in the received file, an intellectual property management and protection Descriptor which describes a required intellectual property management protection, and Usage Rights which designate a number of times the content can be played.

3. A method as described in claim 2, further comprising separating control data and content data.

4. A method of distributing audio visual content in a downloadable file format according to claim 2, whereby audio visual content is distributed in an MP4 file format.

5. A method as described in claim 2, wherein the data required to interpret intellectual property management and protection and related parameters includes at least one of intellectual property management and protection Rights Data, intellectual property management and protection Key Data, intellectual property management and protection Tool Configuration Data, and intellectual property management and protection Descriptor.

6. A method as described in claim 2, wherein data required to interpret intellectual property management and protection and related parameters is stored in separate boxes for video and for audio.

7. A method as described in claim 2, wherein a box for holding intellectual property management and protection-protected content data and a box for holding non-intellectual property management and protection-protected content data are rendered in the content data box.

8. An apparatus distributing audio visual content in a file in a downloadable file format to a non-MPEG-4 compatible receiver so that the receiver can identify whether a media stream in a received file is unrestricted or is intellectual property management and protection controlled, wherein the file includes alternative format identifier control data that is used instead of MPEG-4 system information when the media stream is intellectual property management and protection controlled, comprising:

a first obtainer configured to get data required for intellectual property management and protection from the control data:

a second obtainer configured to get data required to interpret intellectual property management and protection and related parameters from the control data;

a third obtainer configured to get intellectual property management and protection-protected content data from content data;

a fourth obtainer configured to get non-intellectual property management and protection-protected content data from content data;

a first storage configured to store data required for intellectual property management and protection initialization in a first box;

a second storage configured to store data required to interpret intellectual property management and protection and related parameters in a second box;

a third storage configured to store intellectual property management and protection-protected content data in a third box; and a fourth storage configured to store non-intellectual property management and protection-protected content data in a fourth box, wherein the apparatus for distributing includes at least one processor and at least one computer readable storage medium containing the first, second, third, and fourth storages, wherein the data required for intellectual property management and protection initialization stored in the first box includes an intellectual property management and protection Tool List which conveys a list of tools required to access streams in the received file, an intellectual property management and protection Descriptor which describes a required intellectual property management protection, and Usage Rights which designate a number of times the content can be played.

9. An apparatus as described in claim 8, further comprising a separator configured to separate control data and content data.

10. A computer readable storage medium comprising a data structure for distributing audio visual content in a file in a downloadable file format to a non-MPEG-4 compatible receiver so that the receiver can identify whether a media stream in a received file is unrestricted or is intellectual property management and protection controlled, wherein the file includes alternative format identifier control data that is used instead of MPEG-4 system information when the media stream is intellectual property management and protection controlled, comprising:

storing data required for intellectual property management and protection initialization in the control data;

storing data required to interpret intellectual property management and protection and related parameters in the control data;

storing intellectual property management and protection-protected content data in content data; and storing non-intellectual property management and protection-protected content data in content data, wherein the data required for intellectual property management and protection initialization stored in the control data includes an intellectual property management and protection Tool List which conveys a list of tools required to access streams in the received file, an intellectual property management and protection Descriptor which describes a required intellectual property management protection, and Usage Rights information which designate a number of times the content can be played.

* * * * *

UNITED STATES PATENT AND TRADEMARK OFFICE
CERTIFICATE OF CORRECTION

PATENT NO. : 7,668,866 B2  Page 1 of 1
APPLICATION NO. : 10/569639
DATED : February 23, 2010
INVENTOR(S) : Jing Liu et al.

It is certified that error appears in the above-identified patent and that said Letters Patent is hereby corrected as shown below:

On cover page, page 2, line 11, under Item (56) "References Cited" in the printed patent, "2004/0236955 A1 11/2004 Shen et al." should be deleted.

Signed and Sealed this

Fifteenth Day of June, 2010

David J. Kappos
*Director of the United States Patent and Trademark Office*